United States Patent
Tanaka et al.

[11] Patent Number: 5,951,832
[45] Date of Patent: Sep. 14, 1999

[54] ULTRAFINE PARTICLE ENCLOSING FULLERENE AND PRODUCTION METHOD THEREOF

[75] Inventors: Shun-ichiro Tanaka; Bing She Xu, both of Yokohama, Japan

[73] Assignee: Kabushiki Kaisha Toshiba, Japan

[21] Appl. No.: 09/166,799

[22] Filed: Oct. 6, 1998

Related U.S. Application Data

[62] Division of application No. 08/942,488, Oct. 2, 1997, which is a continuation of application No. 08/598,051, Feb. 7, 1996, abandoned.

[30] Foreign Application Priority Data

Feb. 9, 1995 [JP] Japan ................................ 7-021718

[51] Int. Cl.⁶ .................................................. C01B 31/00
[52] U.S. Cl. ........................ 204/157.47; 423/445 B; 423/DIG. 39; 423/DIG. 40
[58] Field of Search ................ 204/157.4, 157.41, 204/157.44, 157.47; 423/445 B, DIG. 39, DIG. 40

[56] References Cited

U.S. PATENT DOCUMENTS

| | | | |
|---|---|---|---|
| 5,300,203 | 4/1994 | Smalley | 204/157.41 |
| 5,316,636 | 5/1994 | Bunshah et al. | 204/157.47 |
| 5,424,054 | 6/1995 | Bethune et al. | 423/447.2 |
| 5,457,343 | 10/1995 | Ajayan et al. | 257/734 |

OTHER PUBLICATIONS

Terrones et al., "Beyond C60: graphite structures for the future," Chem. Soc. Rev., Abstract (1997) no month available.

Puretzky, et al., "Laser ablation of graphite in different buffer gases," Inst. Spectrosc., Abstract (1997) no month available.

Moran–Lopez et al., "A Possible Route to Macroscopic Formation of Endohedral Fullerenes," Solid State Communications, 96:451–457 (1995) no month available.

Guerret–Plecourt et al., "Relation between metal electronic structure and morphology of metal compounds inside carbon nanotubes," Nature, 972:761–764 (1994) no month available.

Bethune et al., "Atoms in carbon cages: the structure and properties of endohedral fullerenes," Nature, 366:123–128 (1993) no month available.

Ugarte et al., "Generation of Graphitic Onions," Electronic Properties of Fullerenes, pp. 78–82 (1993) no month available.

Ugarte, "How to fill or empty a graphitic onion," Chemical Physics Letters, 209:99–103 (1993) no month available.

Primary Examiner—Kathryn Gorgos
Assistant Examiner—Edna Wong
Attorney, Agent, or Firm—Finnegan, Henderson, Farabow, Garrett & Dunner, L.L.P.

[57] ABSTRACT

After an ultrafine particle is disposed on a giant fullerene by driving the ultrafine particle using an electron beam, the ultrafine particle is enclosed in a core hollow portion of the giant fullerene, by contracting the giant fullerene with the electron beam irradiation. Or a metal ultrafine particle composed of an active metal is enclosed in the core hollow portion of the giant fullerene, by irradiating a high energy beam such as the electron beam to an amorphous carbon including the active metal to form the giant fullerene in an irradiated portion, and by contracting the giant fullerene with the irradiation of the high energy beam.

7 Claims, 2 Drawing Sheets

ULTRAFINE PARTICLE ENCLOSING FULLERENE AND PRODUCTION METHOD THEREOF

This is a division of application Ser. No. 08/942,488, filed Oct. 2, 1997, pending, which is a continuation of Ser. No. 08/598,051, filed Feb. 7, 1996 abandoned. The contents of these applications being relied upon and are expressly incorporated by reference herein.

BACKGROUND OF THE INVENTION

1. Field of the Invention

This invention relates to an ultrafine particle enclosing fullerene produced by a novel method and a production method thereof.

2. Description of the Related Art

A Fullerene is a structure comprised of Carbon atoms, e.g., $C_{60}$, and is bonded by intermolecular forces. The Basic Fullerene is a soccer ball-like molecule having a highly symmetrical configuration. All carbon atoms in the molecule are equivalent, and are bonded by a covalent bond. Therefore, the fullerene is an extremely stable crystal. The fullerenes such as $C_{60}$ gather to form the fcc (face-centered cubic lattice) crystallographic structure assuming it as large atom, shows metallic mechanical properties such as a plastic deformation capability, a work hardening, or the like. Consequently, the fullerene is expected to be applied for various uses as a new carbon material. Furthermore, applications of the fullerene for a superconductor material, a catalyst, a nonlinear optical material, or the like are studied based upon the properties of the fullerene itself.

Conventionally, the fullerene like $C_{60}$ is produced by an arc discharge method using a carbon rod or a granular carbon as an electrode, or a laser ablation method irradiating an ultraviolet laser on a graphite surface. The fullerene is produced in a mixed state in a carbon soot, and is extracted by a collector using a filter or benzene.

Higher-order fullerenes (giant fullerenes) called a carbon nanocapsule or a carbon nanotube are included in a soot deposited on the cathode in the above-mentioned arc-discharge. By pulverizing the deposit on the cathode, and then refining pulverized substances using an organic solvents such as ethanol, the above-mentioned carbon nanocapsules or carbon nanotubes are obtained. Since both the carbon nanocapsules and the carbon nanotubes have a hollow shape and an excellent lubricity and weathering resistance, synthesis of new substances and search for new functionalities are pursued by caging metal atoms, fine crystals, or the like in the hollow portions.

The fullerenes are reported hitherto involving a carbide of rare earths such as La, Y, or the like, and fine metal particles such as Fe, Co, Ni, or the like, as other fullerene caged metal atoms, fine crystals or the like in the hollow portion of the carbon nanocapsule or the carbon nanotube mentioned above (referred to as an enclosing fullerene). These are obtained by the arc-discharging, or the like using a carbon electrode including a metal powder, oxide powder, or the like, and by refining the enclosing fullerene included in the deposit on the cathode. However, the conventional production method for the enclosing fullerene has complex processes. In addition, it is difficult to separate the enclosing fullerene from impurities such as a graphite-like substance, an amorphous carbon, or the like.

Furthermore, as the giant fullerene, onion-like graphite is found where fullerenes having larger molecular weight are layered in a form of concentric circles surrounding a shell of core composed of $C_{60}$. However, only a presence of the onion-like graphite is identified, its shape and physical properties are not controlled sufficiently, much less the enclosing fullerene using the onion-like graphite is not realized.

As described above, the conventional enclosing fullerene is included in the deposit on the cathode obtained by the arc-discharge or the like using the carbon electrode including a metal powder, oxide powder, or the like. Thereby, the production processes are complex, and separation from impurities such as the graphite-like substance, the amorphous carbon, or the like is difficult.

Therefore, producing the enclosing fullerene with a relative simple process requiring no separation process is needed. Moreover, a technique producing the enclosing fullerene independently under controlled conditions is needed to produce various types of enclosing fullerenes, for example, to easily find a substance capable of being enclosed inside the fullerene, and to grasp, operate, and control physical properties of the fullerene.

SUMMARY OF THE INVENTION

An object of the present invention being made corresponding to the above is to provide an ultrafine particle enclosing fullerene that can be produced independently with a relative simple process under controlled conditions, and a production method thereof. Here, we designate a fullerene in which an ultrafine particle is enclosed as an ultrafine particle enclosing fullerene.

A first ultrafine particle enclosing fullerene according to the present invention comprises a giant fullerene, and an ultrafine particle enclosed in a core hollow portion of said giant fullerene by disposing on said giant fullerene and by contracting of said giant fullerene with an electron beam irradiation.

A second ultrafine particle enclosing fullerene according to the present invention comprises a giant fullerene formed on a portion of the amorphous carbon base irradiated by a high energy beam selected from the group consisting of an electron beam, a corpuscular beam, and a photon with an active metal disposed on the amorphous carbon base; and a metal ultrafine particle composed of said active metal enclosed in a core hollow portion of said giant fullerene by contracting said giant fullerene with an irradiation of the high energy beam.

A first method for producing an ultrafine particle enclosing fullerene comprises the steps of producing a giant fullerene on an amorphous carbon film in a vacuum, driving and disposing an ultrafine particle on said giant fullerene by an electron beam, and enclosing the ultrafine particle in a core hollow portion of the giant fullerene by contracting the giant fullerene with an irradiation of an electron beam.

A second method for producing an ultrafine particle enclosing fullerene according to the present invention comprises the steps of producing a giant fullerene by irradiating a high energy beam selected from the group consisting of an electron beam, a corpuscular beam, and a photon to an amorphous carbon on which an active metal is disposed in a vacuum, and enclosing the ultrafine particle composed of the active metal in a core hollow portion of the giant fullerene by contracting the giant fullerene with a further irradiation of the high energy beam.

In other words, the present invention is based upon a discovery of producing an ultrafine particle enclosing fullerene by contracting giant fullerene enclosing ultrafine particles thereon with an irradiation of an electron beam, or by forming a giant fullerene on a portion of the amorphous carbon base irradiated by a high energy beam such as an electron beam, a corpuscular beam, and a photon with an active metal and contracting the giant fullerene with a further irradiation of a high energy beam.

In the first ultrafine particle enclosing fullerene of the present invention, the ultrafine particles are enclosed in the core hollow portion of the giant fullerene by contracting the giant fullerene by irradiation of the electron beam to the giant fullerene to encapsulate the ultrafine particles therein. Example of a giant fullerene include carbon nanocapsules, carbon nanotubes and an onion-like graphite. These giant fullerenes can be controlled independently. An original giant fullerene may be of a size capable of encapsulating ultrafine particles. For example, a giant fullerene of 10 to 30 nm is preferable.

The giant fullerene mentioned above is obtained by irradiating an electron beam of more than $1\times10^{19}$ e/cm$^2$.sec (2A/cm$^2$) in a vacuum to metastable metal oxide particles disposed on an amorphous carbon film such as i-carbon, for example. As metastable metal oxide particles used, $\theta$-Al$_2$O$_3$ particles that are metastable phase of Al$_2$O$_3$, or the like are cited as examples. For example, when the electron beam of more than $1\times10^{19}$ e/cm$^2$.sec is irradiated to the $\theta$-Al$_2$O$_3$ disposed on the amorphous carbon film, carbon atoms are provided as constitutional atoms from carbon sources of impurities or adsorbed atoms existed on the $\theta$-Al$_2$O$_3$ surface to produce the giant fullerene such as the carbon nanocapsule, the carbon nanotube, the onion-like graphite, or the like around the metastable metal oxide particles. The giant fullerene is obtained independently, thereby the electron beam can be easily irradiated continuously. Therefore, the giant fullerene is suitable for use with a production of the first ultrafine particle enclosing fullerene.

The ultrafine particles used for the production of the first ultrafine particle enclosing fullerene may be derivable, for example, by the electron beam, and be in a size capable of being disposing on top of the giant fullerene. Concretely, metal ultrafine particles and compound ultrafine particles having a diameter of 5 to 20 nm are cited as examples. As such metal ultrafine particles, Al ultrafine particles are suitable. This is because the Al ultrafine particles are obtained when producing the giant fullerene by irradiating the electron beam to above-mentioned $\theta$-Al$_2$O$_3$ particles, and the Al ultrafine particles are satisfied with the conditions mentioned above. To drive and dispose these ultrafine particles on the top of the giant fullerene, for example, the electron beam is irradiated to the ultrafine particles and the ultrafine particles are moved by controlling the electron beam.

When the electron beam is irradiated to the giant fullerene enclosing the ultrafine particles mentioned above, the giant fullerene is contracted. Following the contraction, the ultrafine particles are enclosed in the core hollow portion of the giant fullerene. The electron beam of more than $1\times10^{19}$ e/cm$^2$.sec (2A/cm$^2$) is suitable. If an intensity of the electron beam is less than $1\times10^{19}$ e/cm$^2$.sec, the carbon atoms can not be activated so that the giant fullerene are contracted. In other words, the electron beam of more than $1\times10^{19}$ e/cm$^2$.sec bears a localized heating effect and an atom displacement (knock-on) effect to the giant fullerene. Thereby, the giant fullerene can be contracted. In addition, it is preferable to irradiate the electron beam in a vacuum of $10^{-5}$ Pa or less. If a vacuum of the electron beam irradiated exceeds $10^{-5}$ Pa, the contraction of the giant fullerene may be inhibited by adsorbing remaining gas atoms or the like.

In the first ultrafine particle enclosing fullerene of the present invention, various types of enclosing fullerenes can be produced, because the ultrafine particles are disposed on the top of the giant fullerene by driving with the electron beam or the like, and then are enclosed in the core hollow portion of the giant fullerene by irradiating the electron beam. In addition, it can be judged relatively easily whether various types of substances are capable of enclosing or not. Moreover, the ultrafine particle enclosing fullerene can be produced separately under controlled conditions. Thereby, physical properties of the fullerene can be grasped, operated and controlled. In general, irradiating the electron beam under controlled heating condition is difficult. Therefore, it is meaningful that the first ultrafine particle enclosing fullerene can be produced on a stage at a room temperature.

In the second ultrafine particle enclosing fullerene of the present invention, an active metal ultrafine particle is enclosed by contracting the giant fullerene by irradiation with a high energy beam. The active metal particle is enclosed a core hollow portion of the giant fullerene by irradiating the high energy beam to an amorphous carbon on which the active metal is contained.

As the amorphous carbon used for a production of the giant fullerene, i-carbon or the like is cited as an example. As the active metal, the ultrafine particles of pure metal having no surface oxide film or the like, for example, pure Al ultrafine particles are cited as an example. A diameter of the metal ultrafine particles as the active metal is preferable in range from 5 to 100 nm. If the diameter of the metal ultrafine particles exceeds 100 nm, a bottom layer of the amorphous carbon may not be activated sufficiently. Metal ultrafine particles having a diameter of less than 5 nm are difficult to produce. More preferable diameter of the metal ultrafine particles is in range from 5 to 20 nm. A method for producing such metal ultrafine particles is not limited. The metal ultrafine particles produced secondarily when producing the giant fullerene are utilized. This will be described later.

When a high energy beam of an electron beam, a corpuscular beam such as an ion beam, or a photon such as a laser is irradiated to the amorphous carbon with the active metal under the above-mentioned conditions, an atomic arrangement of the amorphous carbon underneath the active metal particles changes to induce the formation of a giant fullerene underneath the active metals and thereabouts. An onion-like graphite is cited as an example of a giant fullerene formed by such a method. As the high energy beam irradiated in producing such giant fullerene, the electron beam having an intensity of more than $1\times10^{19}$ e/cm$^2$.sec (2A/cm), the corpuscular beam or the photon having an equal effect which can induce an atom displacement (knock-on) is preferably used. For example, if an intensity of the electron beam is less than $1\times10^{19}$ e/cm$^2$.sec, the amorphous carbon can not be activated so that the giant fullerene are produced. In other words, the electron beam having the intensity of more than $1\times10^{19}$ e/cm$^2$.sec bears a localized heating effect and an atom displacement (knock-on) effect to the metal ultrafine particle and the amorphous carbon. Thereby, the giant fullerene can be produced. In the case of the corpuscular beam or the photon, it is same as the electron beam. In addition, it is preferable to irradiate the electron beam in a vacuum of $10^{-5}$ Pa or less. If a vacuum of the electron beam irradiated exceeds $10^{-5}$ Pa, the production of the giant fullerene may be inhibited by adsorbing remaining gas atoms or the like.

In the second ultrafine particle enclosing fullerene of the present invention, the active metal is enclosed as the ultrafine particles in a core hollow portion of the giant fullerene by irradiating the high energy beam to the giant fullerene produced under the active metals, by contracting the giant fullerene, and by minimizing the size of the active metals by using, for example, metal ultrafine particles. The high energy beam irradiated and conditions are preferably same as the above-mentioned conditions of producing the giant fullerene. If an intensity of the electron beam is less than $1 \times 10^{19}$ e/cm².sec, the amorphous carbon can not be activated so that the giant fullerene are contracted. In other words, the electron beam having the intensity of more than $1 \times 10^{19}$ e/cm².sec bears a localized heating effect and an atom displacement (knock-on) effect to the giant fullerene. Thereby, the giant fullerene can be contracted. In the case of the corpuscular beam or the photon, it is same as the electron beam. In addition, if a vacuum of the electron beam irradiated exceeds $10^{-5}$ Pa, the contraction of the giant fullerene may be inhibited by adsorbing remaining gas atoms or the like.

The above-mentioned second ultrafine particle enclosing fullerene of the present invention can be produced selectively and independently in the irradiated portion of the electron beam, or the like, and is effective in the case of producing various types of enclosing fullerenes. Moreover, the ultrafine particle enclosing fullerene can be produced separately under controlled conditions. Thereby, physical properties of the fullerene can be grasped, and various operations and controls can be realized. In addition, it is meaningful that the second ultrafine particle enclosing fullerene can also be produced on a room temperature stage.

DESCRIPTION OF THE PREFERRED EMBODIMENTS

Then, embodiments of the present invention will be described.

Embodiment 1

A production of a giant fullerene and metal fine particles will be described. First, spherical θ-Al₂O₃ particles (purity 99.8%) with a diameter of about 100 nm were prepared. The particles were dispersed in alcohol, applied to an amorphous carbon support film composed of an i-carbon and dried. Secondly, the amorphous carbon support film including spherical θ-Al₂O₃ particles was set on a stage of 200 kV HRTEM (JEOL, JEM-2010) at room temperature.

Thirdly, a vacuum chamber was evacuated to $1 \times 10^{-5}$ Pa. Fourthly, an electron beam having an intensity of $1.3 \times 10^{°}$ e/cm² (20A/cm²) was irradiated to the θ-Al₂O₃ particles with a diameter of 100 nm disposed on the carbon support film. By the electron beam irradiation, the giant fullerene composed of an onion-like graphite with a diameter of 10 to 30 nm, and Al ultrafine particles with a diameter of 5 to 10 nm were produced on the amorphous carbon support film.

Figure 1A:
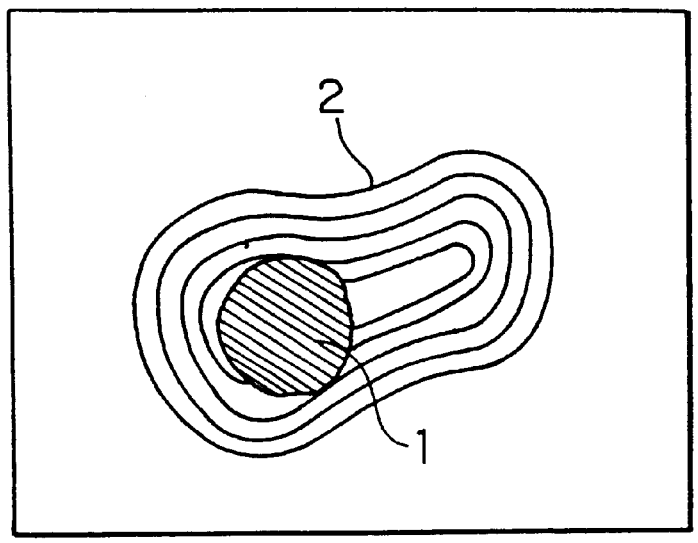
FIG. 1A is a schematic diagram illustrating a production stage of ultrafine particle enclosing fullerene according to the embodiment 1.
Figure 1B:
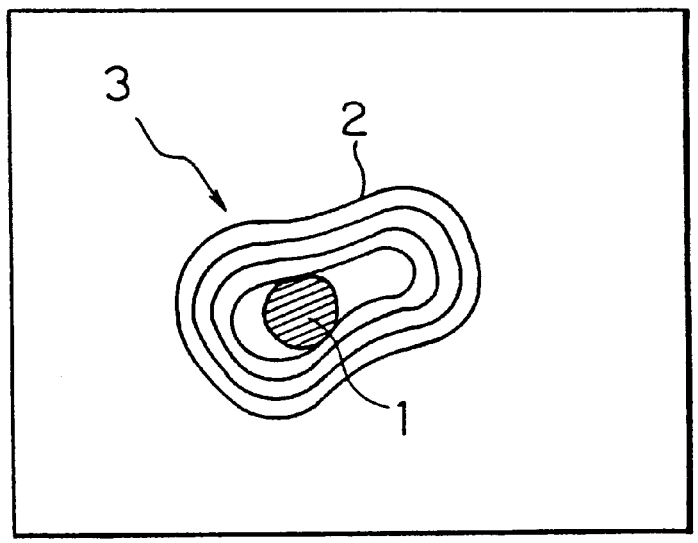
FIG. 1B is a schematic diagram illustrating a production stage of the ultrafine particle enclosing fullerene after time is elapsed according to the embodiment 1.

Using the onion-like graphite and the Al ultrafine particles obtained mentioned above, an ultrafine particle enclosing fullerene was produced. A status was observed in-situ. The result of the observation will be described with reference to schematic diagrams of FIGS. 1A and 1B First, the onion-like graphite with a longer diameter of 15 nm and the adjacent Al ultrafine particle with a diameter of 5 nm were selected. An electron beam was irradiated and scanned the Al ultrafine particles. As shown in FIGS. 1. 1A, the Al ultrafine particle 1 was induced and disposed on a top of the onion-like graphite 2.

Secondly, the electron beam (diameter: 250 nm) of $1.3 \times 10^{20}$ e/cm².sec (20A/cm²) was irradiated to the onion-like graphite 2 on which the Al ultrafine particle 1 was disposed when the irradiation time of the electron beam elapsed, the onion-like graphite 2 was gradually contracted. After 560 seconds from the starting of irradiation of the electron beam, it was observed that the Al ultrafine particle 1 was enclosed in a core hollow portion of the onion-like graphite 2 (Al ultrafine particle enclosing fullerene 3), as shown in FIG. 1B. In the Al ultrafine particle enclosing fullerene 3, the longer diameter of the onion-like graphite 2 was 10 nm, and the diameter of the Al ultrafine particle in the core hollow portion was 2 nm.

Thus, the Al ultrafine particle enclosing fullerene 3 was obtained by the electron beam irradiation to the giant fullerene composed of the onion-like graphite 2 disposed having thereon the Al ultrafine particle 1. The formation of the Al ultrafine particle enclosing fullerene 3 is based upon both a localized heating effect and an atom displacement (knock-on) effect, by the irradiated electron.

Embodiment 2

A production of Al ultrafine particles as an active metal will be described. Similar to the embodiment 1, an amorphous carbon support film having spherical θ-Al₂O₃ particles with a diameter of 100 nm disposed thereon was arranged on a room temperature stage disposed in a vacuum chamber of 200 kv TEM apparatus. After the above-mentioned vacuum room was evacuated to $1 \times 10^{-5}$ Pa, an electron beam of $1.3 \times 10^{20}$ e/cm².sec (20A/cm²) was irradiated to the θ-Al₂O₃ particles disposed on the amorphous carbon support film. By the electron beam irradiation, Al ultrafine particles with a diameter of 5 to 15 nm were produced on the amorphous carbon support film.

Using the Al ultrafine particles as an active metal, a giant fullerene was produced. Using the giant fullerene, an ultrafine particle enclosing fullerene was produced. Concretely, the amorphous carbon support film having the Al ultrafine particles is disposed in the vacuum chamber of the TEM apparatus. The Al ultrafine particle with a diameter of 10 nm were selected from the Al ultrafine particles on the carbon support film. The electron beam (diameter=250 nm) of $1.3 \times 10^{20}$ e/cm².sec (20A/cm²) was irradiated to the Al ultrafine particle together with a layer of the amorphous carbon.

Figure 2A:
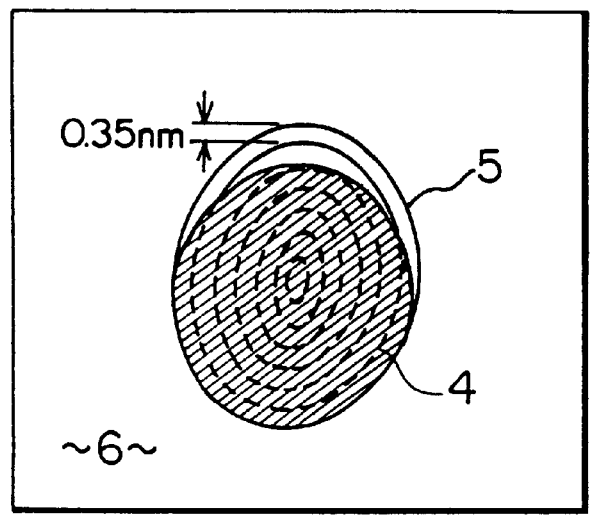
FIG. 2A is a schematic diagram illustrating a production stage of ultrafine particle enclosing fullerene according to the embodiment 2.
Figure 2B:
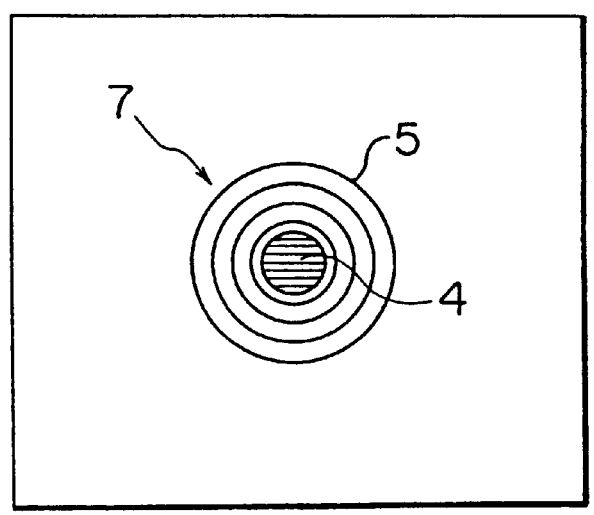
FIG. 2B is a schematic diagram illustrating a production stage of the ultrafine particle enclosing fullerene after time is elapsed according to the embodiment 2.

While irradiating the Al ultrafine particle with the electron beam, a status of the Al ultrafine particle and the amorphous carbon was observed in-situ. The result of the observation will be described with reference to schematic diagrams of FIGS. 2A and 2B. After 300 seconds from the starting of irradiation of the electron beam, carbon textures with a diameter of 10 nm in a form of concentric circles were induced at a bottom portion of the Al ultrafine particle 4. The distance between the layers of the carbon textures was about 0.35 nm. Thereby, these were identified as the onion-like graphite 5. Around the onion-like graphite 5, the amorphous carbon 6 was maintained.

By continuing the irradiation of the electron beam, the onion-like graphite 5 was gradually contracted, and the Al ultrafine particle 4 was minimized. After 800 to 1000 seconds from the starting of irradiation of the electron beam, the Al ultrafine particle 4 was minimized to a diameter of 2 nm, was enclosed in the core hollow portion of the onion-like graphite 5 contracted, and a formation of the Al ultrafine particle enclosing fullerene 7 was observed. In the Al ultrafine particle enclosing fullerene 7, a diameter of the onion-like graphite 5 was 10 nm.

Thus, the onion-like graphite 5 that is a sort of the giant fullerene, and the Al ultrafine particle enclosing fullerene 7 enclosed the Al ultrafine particle in the core hollow portion of the onion-like graphite 5 were obtained by the electron beam irradiation to the amorphous carbon with the Al ultrafine particle. The production of the onion-like graphite 5 and the Al ultrafine particle enclosing fullerene 7 is based upon both a localized heating effect and an atom displacement (knock-on) effect by the irradiated electron.

As apparent from the above-mentioned embodiments, according to the present invention, the enclosure of ultrafine particle within a core hollow portion of a giant fullerene can be achieved by an electron beam irradiation or the like, under easily controlled conditions such as on a room temperature stage, there is a global possibility to develop various manipulations by an electron beam with a diameter of nanometer, or the like.

As described above, according to the present invention, an ultrafine particle enclosing fullerene can be produced with a relatively simple process requiring no separation process. In addition, it can be judged relative easily whether substances are capable of enclosing within the fullerene or not. Moreover, the fullerene can be operated and controlled relative easily. Consequently, the ultrafine particle enclosing fullerene of the present invention is greatly contributed to a production of a novel enclosing fullerene, and an application and a development thereof.

What is claimed is:

1. A method for producing an ultrafine particle enclosing fullerene, comprising the steps of:

producing a giant fullerene on an amorphous carbon film in a vacuum, disposing an ultrafine particle on said giant fullerene by irradiating said ultrafine particle with an electron beam, and enclosing said ultrafine particle in a core hollow portion of said giant fullerene by contracting said giant fullerene by further irradiation with the electron beam.

2. The method for producing an ultrafine particle enclosing fullerene as set forth in claim 1, wherein said step of producing said giant fullerene comprises irradiating a metastable metal oxide particle disposed on the amorphous carbon film with an electron beam of more than $1\times10^{19}$ e/cm$^2$.sec.

3. The method for producing an ultrafine particle enclosing fullerene as set forth in claim 2, wherein said metastable metal oxide particle is a $\theta$-Al$_2$O$_3$ particle.

4. The method for producing an ultrafine particle enclosing fullerene as set forth in claim 1, wherein said ultrafine particle is an Al ultrafine particle with a diameter of 5 to 20 nm.

5. A method for producing an ultrafine particle enclosing fullerene, comprising the step of:

disposing an active metal particle on an amorphous carbon film in a vacuum, producing a giant fullerene by irradiating said amorphous carbon film on which said active metal particle is disposed with an electron beam in the vacuum, and enclosing the said active metal particle in a core hollow portion of said giant fullerene by contracting said giant fullerene with a further irradiation of said electron beam.

6. The method for producing an ultrafine particle enclosing fullerene as set forth in claim 5, wherein said active metal particle is an Al ultrafine particle with a diameter of 5 to 100 nm.

7. The method for producing an ultrafine particle enclosing fullerene as set forth in claim 5, wherein said electron beam has an intensity of more than $1\times10^{19}$ e/cm$^2$.sec.

* * * * *

UNITED STATES PATENT AND TRADEMARK OFFICE
CERTIFICATE OF CORRECTION

PATENT NO.: 5,951,832

DATED: September 14, 1999

INVENTOR(S): Tanaka

It is certified that an error appears in the above-identified patent and that said Letters Patent is hereby corrected as shown below:

Claim 2, column 8, line 12, delete "e/cm$^2$.sec" and insert --e/cm$^2$·sec--; and Claim 7, column 8, line 41, delete "e/cm$^2$.sec" and insert --e/cm$^2$·sec--.

Signed and Sealed this

Sixth Day of June, 2000

Attest:

Q. TODD DICKINSON

*Attesting Officer*  *Director of Patents and Trademarks*